H. Tyler.
Plant Syringe.
No. 89,362.      Patented Apr. 27, 1869.
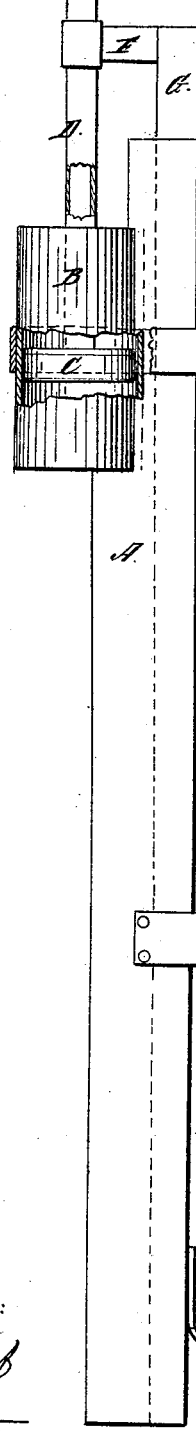
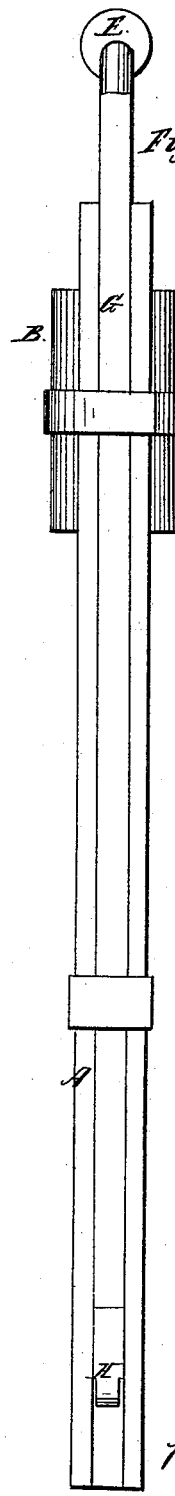
Witnesses:
Inventor:
Hiram Tyler
per Alexander & Mason
Attys

United States Patent Office.

HIRAM TYLER, OF GAINES, NEW YORK.

Letters Patent No. 89,362, dated April 27, 1869; antedated April 15, 1869.

IMPROVEMENT IN TREE AND PLANT-SPRINKLERS.

The Schedule referred to in these Letters Patent and making part of the same.

*To all whom it may concern:*

Be it known that I, HIRAM TYLER, of Gaines, in the county of Orleans, and in the State of New York, have invented certain new and useful Improvements in Tree and Plant-Syringe; and do hereby declare that the following is a full, clear, and exact description thereof, reference being had to the accompanying drawings, and to the letters of reference made thereon.

The nature of my invention consists in the construction of a syringe, by the use of which a fluid may be discharged on any side of the topmost branches of a tree, destroying any worms or insects which may be on the same, without injury to the tree.

In order to enable others skilled in the art to which my invention appertains to make and use the same, I will now proceed to describe its construction and operation, referring to the annexed drawings, which form a part of this specification, and in which—

Figure 1 is a side view, and
Figure 2, a rear view.

A represents a staff, of any length required, to reach as high up on a tree as may be desired. Near the upper part of this staff the syringe is secured.

The syringe consists of a cylinder, B, in which a plunger, C, moves up and down.

The hollow rod, D, forms the plunger-staff, and is secured to the centre of the plunger, a hole through the latter allowing the fluid to pass through the same.

The sprinkler E is secured sideways to the upper end of the tube D, and the tube is connected by means of an arm, F, to a slide, G, which runs in a groove, the whole length of the staff A, on its rear side.

The slide G is provided with a thumb-piece, H, near its lower end, for the purpose of operating the same.

When the plunger C is down to the bottom of the cylinder B, insert the sprinkler into the fluid, and push the slide G out, when the fluid is drawn into the cylinder, then raise it so that the sprinkler points at the part where the fluid is to be discharged. By then pulling the slide down, the fluid is forced through the tube D, and out through the sprinkler.

Having thus fully described my invention,

What I claim as new, and desire to secure by Letters Patent, is—

The combination of the stationary cylinder B, plunger C, tube D, and sprinkler E, with a staff of suitable length, and a slide in the same, for the purpose of discharging fluid on the branches of a tree, of whatever height the same may be, the several parts being constructed and arranged substantially as herein set forth.

In testimony that I claim the foregoing, I have hereunto set my hand, this 9th day of July, 1868.

HIRAM TYLER.

Witnesses:
   THOMAS S. CLARKE,
   GEO. W. BAWELLY.